United States Patent
Janssen et al.

(10) Patent No.: US 11,765,124 B2
(45) Date of Patent: Sep. 19, 2023

(54) RECEIVING LOGIC HARDWARE FOR NETWORK SUBSCRIBERS, NETWORK SUBSCRIBER, AND AUTOMATION NETWORK

(71) Applicant: Beckhoff Automation GmbH, Verl (DE)

(72) Inventors: Dirk Janssen, Verl (DE); Florian Essler, Augsburg (DE); Guido Beckmann, Verl (DE); Hans Beckhoff, Verl (DE); Holger Büttner, Berlin (DE); Martin Rostan, Nuremberg (DE); Thomas Rettig, Rheda-Wiedenbrück (DE)

(73) Assignee: Beckhoff Automation GmbH, Verl (DE)

( * ) Notice: Subject to any disclaimer, the term of this patent is extended or adjusted under 35 U.S.C. 154(b) by 38 days.

(21) Appl. No.: 17/536,755

(22) Filed: Nov. 29, 2021

(65) Prior Publication Data

US 2022/0086117 A1 Mar. 17, 2022

Related U.S. Application Data

(63) Continuation of application No. PCT/EP2020/061730, filed on Apr. 28, 2020.

(30) Foreign Application Priority Data

Jun. 18, 2019 (DE) ...................... 10 2019 116 510.5

(51) Int. Cl.
*G06F 15/16* (2006.01)
*H04L 51/48* (2022.01)
*H04L 51/212* (2022.01)

(52) U.S. Cl.
CPC ............ *H04L 51/48* (2022.05); *H04L 51/212* (2022.05)

(58) Field of Classification Search
CPC .............................. H04L 51/48; H04L 51/212
(Continued)

(56) References Cited

U.S. PATENT DOCUMENTS

| | | | |
|---|---|---|---|
| 6,178,207 B1 * | 1/2001 | Richards | ............ H04L 27/0008 375/259 |
| 7,379,451 B1 * | 5/2008 | Brebner | .................. H04L 45/00 370/356 |

(Continued)

FOREIGN PATENT DOCUMENTS

| | | |
|---|---|---|
| CN | 101175025 A | 5/2008 |
| CN | 102170430 A | 8/2011 |

(Continued)

OTHER PUBLICATIONS

International Search Report and Written Opinion dated Jul. 10, 2020 in connection with International Patent Application No. PCT/EP2020/061730, 30 pages including English translation.

(Continued)

*Primary Examiner* — Alicia Baturay
(74) *Attorney, Agent, or Firm* — Dorsey & Whitney LLP

(57) ABSTRACT

A receiving logic of a network subscriber can be configured in a first filter setting to forward telegrams having first and second addressing techniques to first and second processing units, with a transmitting logic configured to forward the telegrams to a transmitting port. In a second filter setting, the receiving logic can be configured to duplicate the telegrams and forward to the first and second processing units, with the first processing unit configured to discard telegrams using the second addressing technique and the second processing unit configured to discard telegrams using the first address- (Continued)

ing technique. The receiving logic of a third filter setting can be configured to duplicate telegrams and forward to the first and second processing units, with the transmitting logic configured to forward only telegrams using the first addressing technique from the first processing unit, and only telegrams using the second addressing technique from the second processing unit.

15 Claims, 3 Drawing Sheets

(58) Field of Classification Search
USPC .......................................... 709/206
See application file for complete search history.

(56) References Cited

U.S. PATENT DOCUMENTS

| | | | | |
|---|---|---|---|---|
| 7,385,989 B2* | 6/2008 | Higuchi | ............. | H04L 61/4511 |
| | | | | 370/395.54 |
| 7,398,386 B2* | 7/2008 | Kessler | ................ | H04L 63/045 |
| | | | | 713/150 |
| 7,913,294 B1* | 3/2011 | Maufer | .................. | H04L 12/66 |
| | | | | 713/153 |
| 7,950,053 B2* | 5/2011 | Muramoto | ......... | H04L 63/0236 |
| | | | | 726/13 |
| 7,990,971 B2* | 8/2011 | Ra | ........................... | H04L 45/00 |
| | | | | 370/466 |
| 8,200,849 B1 | 6/2012 | Raichek | | |
| 8,621,325 B2* | 12/2013 | Yamamoto | ............. | H04L 49/25 |
| | | | | 714/766 |
| 8,856,420 B2* | 10/2014 | Chandra | ................ | H04L 47/39 |
| | | | | 710/316 |
| 9,565,132 B2* | 2/2017 | Chandra | ................ | H04L 45/52 |
| 10,732,594 B2* | 8/2020 | Sachs | ................... | G05B 19/054 |
| 2013/0173868 A1 | 7/2013 | Leyrer et al. | | |

FOREIGN PATENT DOCUMENTS

| | | |
|---|---|---|
| CN | 105791177 A | 7/2016 |
| CN | 106411740 A | 2/2017 |
| DE | 10004425 A1 | 1/2002 |
| DE | 10058524 A1 | 6/2002 |
| DE | 102014112082 A1 | 2/2016 |
| EP | 2501079 A1 | 9/2012 |
| WO | 0158114 A1 | 8/2001 |

OTHER PUBLICATIONS

Office Action dated Jun. 1, 2022 in connection with Chinese patent application No. 202080044468.4, 12 pages including English translation.
"EtherCAT—the Ethernet Fieldbus," EtherCAT Technology Group, Nov. 2012, 21 pages.

* cited by examiner

RECEIVING LOGIC HARDWARE FOR NETWORK SUBSCRIBERS, NETWORK SUBSCRIBER, AND AUTOMATION NETWORK

CROSS-REFERENCE TO RELATED APPLICATIONS

This patent application is a continuation of International Patent Application PCT/EP2020/061730, NETWORK SUBSCRIBER AND AUTOMATION NETWORK, filed Apr. 28, 2020, and claims the priority of German patent application DE 10 2019 116 510.5, NETZWERKTEILNEHMER UND AUTOMATISIERUNGSNETZWERK, filed Jun. 18, 2019, each of which is hereby incorporated by reference herein, in the entirety and for all purposes.

FIELD

The present invention relates to a network subscriber and an automation network.

BACKGROUND

Automation networks are frequently operated as "field-bus systems." These are industrial bus systems that allow for controlling the machines or systems of the automation network in real time, the machines or systems of the automation network being controlled by programmable logic controllers (PLCs). The PLC uses the field-bus system for communication of the field devices, e.g. sensors and actuators of the machines or systems of the automation network, with the PLC. If a plurality of network subscribers sends telegrams via the same data line in the automation network, which may be embodied as a wired or wireless bus system, possibilities must exist for the network subscribers to share the same data line for transmitting data. For this purpose, there are defined hierarchies and standardized data transmission protocols.

In most cases, the field-bus systems operate in so-called "master-slave mode." This means that at least one network subscriber is embodied as a master subscriber and takes over the control of the processes, while the other network subscribers, as slave subscribers, take over the processing of subtasks in the control mode of the automation network. Data are exchanged in the automation network by telegrams that are output to the slave subscribers by the master subscriber. The slave subscribers read out the output data addressed to them from the telegram and/or place their input data into the telegram and send the telegram back to the master subscriber.

Network distributors, so-called "switches," are frequently used in automation networks to connect the individual data lines to the connected network subscribers and to ensure that the data or telegrams reach their destination via the network subscribers connected to the individual input/output ports of the network distributors via further data lines.

As a rule, data communication takes place by telegrams for the control mode of an automation network using telegrams that have a specific addressing technique or a specific underlying data transmission protocol. Here, telegrams having a first addressing technique may be realized as so-called "passing telegrams," wherein in particular the underlying EtherCAT data transmission protocol is conceivable. When processing the telegrams in pass-through, each network subscriber reads the output data of the telegram addressed to it "on the fly" and/or places its input data into the telegram before the network subscriber forwards the telegram to the next network subscriber. Here, sending a telegram from a network subscriber in an EtherCAT network corresponds to entering information into the telegram sent by the master network subscriber and to forwarding the telegram to a network subscriber following in the telegram run direction, since a network subscriber in an EtherCAT network does not itself send any response telegrams to requests from the master subscriber.

In such an EtherCAT network no routing of the telegrams, i.e. no definition of transmission paths for transmitting the telegrams to a certain network subscriber is necessary, if the network subscriber is able to process the EtherCAT data transmission protocol. The reason for this is that in such an automation network the telegrams are always routed through all network subscribers and returned to the master subscriber by the last network subscriber in a chain of network subscribers connected to a data line.

Alternatively, the passing telegrams may also be implemented in the automation network in a way that deviates from the EtherCAT data transmission protocol, e.g. with an underlying Sercos 3 (serial real-time communication system) data transmission protocol, i.e. as Sercos 3 (or Sercos III) passing telegrams.

In addition, automation networks exist in which data communication for control operation is implemented by telegrams using a second addressing technique. For example, the telegrams using the second addressing technique may be implemented as so-called "individual telegrams," i.e. intended for processing by only one network subscriber in the automation network. In particular, it is conceivable that the individual telegrams are implemented as Ethernet telegrams, i.e. telegrams with an underlying Ethernet data transmission protocol, such as in PROFINET or OPC-UA. In the so-called "DFP mode" for PROFINET, e.g. a telegram comprising a plurality of individual telegrams is sent to a plurality of network subscribers, each of said plurality of individual telegrams having its own checksum for integrity checking of transmitted data, wherein the individual telegrams are arranged inversely to the arrangement of the network subscribers in the automation network in the telegram.

A disadvantage of prior art automation networks is the fact that data communication between the network subscribers of the automation network is usually only provided for telegrams using one addressing technique. So far, no network subscriber is known that may process both telegrams having a first addressing technique, which are e.g. processed by a plurality of network subscribers on the fly, and telegrams having a second addressing technique, which are e.g. intended for processing by only one network subscriber.

SUMMARY

The present invention provides an improved network subscriber and an improved automation network.

EXAMPLES

According to a first aspect, a network subscriber for an automation network is proposed. The network subscriber comprises at least one receiving port and at least one transmitting port to which further automation network subscribers may be connected via a data line network. The network subscriber is embodied to receive telegrams using a first addressing technique and telegrams using a second addressing technique via the receiving port and to send them via the transmitting port. The network subscriber comprises a first processing unit for processing the telegrams using the first addressing technique and a second processing unit for processing the telegrams using the second addressing technique. The network subscriber comprises a receiving logic connected to the receiving port and to the first processing unit and to the second processing unit, and a transmitting logic connected to the transmitting port and to the first processing unit and to the second processing unit. In a first filter setting, the receiving logic is embodied to forward telegrams using the first addressing technique received via the receiving port to the first processing unit and to forward telegrams using the second addressing technique received via the receiving port to the second processing unit and the transmitting logic is embodied to forward telegrams received from the first processing unit and from the second processing unit, respectively, to the transmitting port. In a second filter setting, the receiving logic is embodied to duplicate telegrams using the first addressing technique received via the receiving port or telegrams using the second addressing technique received via the receiving port and to respectively forward one telegram to the first processing unit and to the second processing unit and wherein the first processing unit is embodied to discard telegrams using the second addressing technique and the second processing unit is embodied to discard telegrams using the first addressing technique, and wherein the transmitting logic is embodied to forward telegrams received from the first processing unit and from the second processing unit, respectively, to the transmitting port. In a third filter setting, the receiving logic is embodied to duplicate telegrams using the first addressing technique received via the receiving port and telegrams using the second addressing technique received via the receiving port and to respectively forward a telegram to the first processing unit and to the second processing unit, and wherein the transmitting logic is embodied to forward only telegrams using the first addressing technique from the first processing unit to the transmitting port and to discard telegrams using the first addressing technique from the second processing unit and to forward only telegrams using the second addressing technique from the second processing unit to the transmitting port and to discard telegrams using the second addressing technique from the first processing unit.

According to a second aspect, an automation network is proposed. The automation network comprises automation network subscribers. At least one automation network subscriber is embodied as a master subscriber that outputs telegrams using a first addressing technique and telegrams using a second addressing technique to the automation network subscribers via a data line network. At least one automation network subscriber is embodied as a network subscriber. The network subscriber comprises at least one receiving port and at least one transmitting port to which further automation network subscribers may be connected via a data line network. The network subscriber is embodied to receive telegrams using a first addressing technique and telegrams using a second addressing technique via the receiving port and to send them via the transmitting port. The network subscriber comprises a first processing unit for processing the telegrams using the first addressing technique and a second processing unit for processing the telegrams using the second addressing technique. The network subscriber comprises a receiving logic connected to the receiving port and to the first processing unit and to the second processing unit, and a transmitting logic connected to the transmitting port and to the first processing unit and to the second processing unit. In a first filter setting, the receiving logic is embodied to forward telegrams using the first addressing technique received via the receiving port to the first processing unit and to forward telegrams using the second addressing technique received via the receiving port to the second processing unit and the transmitting logic is embodied to forward telegrams received from the first processing unit and from the second processing unit, respectively, to the transmitting port. In a second filter setting, the receiving logic is embodied to duplicate telegrams using the first addressing technique received via the receiving port or telegrams using the second addressing technique received via the receiving port and to respectively forward one telegram to the first processing unit and to the second processing unit and wherein the first processing unit is embodied to discard telegrams using the second addressing technique and the second processing unit is embodied to discard telegrams using the first addressing technique. The transmitting logic is embodied to forward telegrams received from the first processing unit and from the second processing unit, respectively, to the transmitting port. In a third filter setting, the receiving logic is embodied to duplicate telegrams using the first addressing technique received via the receiving port and telegrams using the second addressing technique received via the receiving port and to respectively forward a telegram to the first processing unit and to the second processing unit, and wherein the transmitting logic is embodied to forward only telegrams using the first addressing technique from the first processing unit to the transmitting port and to discard telegrams using the first addressing technique from the second processing unit and to forward only telegrams using the second addressing technique from the second processing unit to the transmitting port and to discard telegrams using the second addressing technique from the first processing unit.

According to a third aspect, a receiving logic for a network subscriber is proposed. The receiving logic is embodied in a first filter setting to forward telegrams having a first addressing technique to a first processing unit and telegrams having a second addressing technique to a second processing unit. A transmitting logic of the network subscriber is embodied to forward the telegrams to a transmitting port. The receiving logic is embodied in a second filter setting, to duplicate the telegrams and forward one telegram to each of the first and second processing units of the network subscriber. The first processing unit is embodied to discard telegrams using the second addressing technique. The second processing unit is embodied to discard telegrams using the first addressing technique. The transmitting logic is embodied to forward the telegrams to the transmitting port. In a third filter setting the receiving logic is embodied to duplicate received telegrams and to respectively forward a telegram to the first and second processing units. The transmitting logic is embodied to forward only telegrams using the first addressing technique from the first processing unit and only telegrams using the second addressing technique from the second processing unit to the transmitting port.

The proposed network subscriber may process both telegrams using a first addressing technique and telegrams using a second addressing technique. For example, the telegrams using the first addressing technique may be embodied as passing telegrams and the telegrams using the second addressing technique may be embodied as individual telegrams. This advantageously contributes to the fact that an automation network may be "supplied" with different telegrams from at least one master subscriber. In particular, the advantages of the two addressing techniques may be combined in the proposed network subscriber. The advantage of processing the telegrams from the network subscribers in passing is, above all, that process data may be exchanged with many subscribers quickly and with little overhead. Process data are analogous and digital values that are obtained from a technical process by sensors and transferred to the programmable logic controller via the field bus. The term overhead refers to additional data that, when transmitting and storing process data, are not provided as user data. The advantage of embodying an automation network that is "supplied" with individual telegrams is the simplified realization of the data exchange between the individual subscribers from a control level, e.g. starting from the master subscriber or a cloud. A cloud refers to an IT infrastructure that is made available via a computer network, e.g. via the Internet, without requiring installation on a local computer.

The individual components of the proposed network subscriber may act as so-called "telegram switches," i.e. they may select the telegrams specifically and forward them to the respective processing unit, provided that the receiving logic is embodied as a telegram switch, or they may select the telegrams specifically and forward them to the transmitting logic if the first and second processing units are embodied as telegram switches, or they may forward the telegrams to the transmitting port in a specifically selected manner, provided that the transmitting logic is embodied as a telegram switch. Furthermore, it is conceivable that the receiving logic may perform a dual function and, in addition to being suitable for the targeted selection of the telegrams, is also embodied to duplicate a telegram using the first or second addressing technique and received from the master subscriber via the receiving port and to forward one telegram each to the first and second processing units. In the mentioned case, the receiving logic may e.g. be embodied to duplicate a received telegram, while the first and second processing units or the transmitting logic may be embodied to actually select the telegrams. Furthermore, the transmitting logic may be embodied in the same way as the receiving logic.

The proposed network subscriber offers a flexible filtering due to the individual components, which was explained above as the first to third filter setting. Thus, the network subscriber may be individually adapted to the embodiment of the automation network and may be set according to the specific requirements. Also, the proposed network subscriber may contribute to the reduction of network components in the automation network, is compatible with existing automation networks and may be easily integrated into them.

In a further embodiment, the receiving logic in the first filter setting is embodied to distinguish the telegrams using the first addressing technique and the telegrams using the second addressing technique on the basis of an embodiment of the telegrams in which a header section of the telegrams using the first addressing technique is formed differently from a header section of the telegrams using the second addressing technique, respectively. In the second filter setting, the first processing unit and the second processing unit are embodied to distinguish the telegrams using the first addressing technique and the telegrams using the second addressing technique based on the embodiment of the telegrams in which, respectively, the header section of the telegrams using the first addressing technique is embodied differently from the header section of the telegrams using the second addressing technique. In the third filter setting, the transmitting logic is embodied to distinguish the telegrams using the first addressing technique and the telegrams using the second addressing technique on the basis of the embodiment of the telegrams in which the header section of the telegrams using the first addressing technique is embodied differently from the header section of the telegrams using the second addressing technique, respectively.

If the header section of the telegrams using the first addressing technique is formed differently from the header section of the telegrams using the second addressing technique, a forwarding decision may be made by the receiving logic or the first processing unit and the second processing unit or the transmitting logic at the earliest possible time when the telegrams are received. In this context, it is conceivable that the preamble of the telegrams is embodied differently, since the preamble in an Ethernet data frame according to the IEEE 802.3 standard forms the start section in the header section of a telegram that corresponds to the Ethernet data frame structure, and may thus form the basis for the earliest possible forwarding decision. For example, the bit sequence of the preamble of the telegrams using the first addressing technique in the header section may be formed differently from the bit sequence of the preamble of the telegrams using the second addressing technique in the header section. Apart from the different embodiment of the preamble, each other data field according to the IEEE 802.3 Ethernet data frame structure for the telegrams with the first and second addressing technique may also be embodied differently from each other so that a differentiation of the telegrams is possible on the basis of their header sections.

The different embodiment of the header sections of the telegrams using the first addressing technique and the telegrams using the second addressing technique, in combination with the suitability of the components as telegram switches, may also make a positive contribution to minimizing the delay time of the telegrams. Furthermore, the differentiation and selection of the telegrams on the basis of the different design of the header sections is conceivable for all above-presented filter settings, also for the third filter setting, in which the transmission logic is embodied as a telegram switch and may be set for only forwarding telegrams using the first addressing technique from the first processing unit to the transmitting port and discarding telegrams using the first addressing technique from the second processing unit and for only forwarding telegrams using the second addressing technique from the second processing unit to the transmitting port and discarding telegrams using the second addressing technique from the first processing unit. It is conceivable, in a configuration phase, to set the individual components with the master subscriber in such a way that they may distinguish a header section of a telegram using the first addressing technique from a header section of a telegram using the second addressing technique.

In a further embodiment, the receiving logic in the first filter setting, is embodied to distinguish the telegrams using the first addressing technique and the telegrams using the second addressing technique based on a fixed time window in which telegrams using the first addressing technique and telegrams using the second addressing technique are in each case received by the receiving logic via the receiving port. In the second filter setting, the first processing unit and the second processing unit are embodied to distinguish the telegrams using the first addressing technique and the telegrams using the second addressing technique, respectively, based on the predefined time window in which telegrams using the first addressing technique and telegrams using the second addressing technique, respectively, are received by the receiving logic via the receiving port. In the third filter setting, the transmitting logic is embodied to distinguish the telegrams using the first addressing technique and the second addressing technique on the basis of the specified time window in which telegrams using the first addressing technique and telegrams using the second addressing technique are in each case received by the receiving logic via the receiving port.

The predefined time window may e.g. be configured as a cyclically repeating time window by the master subscriber for the first and third filter setting, in which the receiving logic is embodied for selecting and selectively forwarding the telegrams to the first processing unit and to the second processing unit for processing the telegrams, and in which the transmitting logic is embodied for selecting and selectively forwarding the telegrams, from the first processing unit or from the second processing unit, to the transmitting port. It is also conceivable that the predefined time window is configured for the second filter setting, in which the first processing unit discards telegrams using the second addressing technique and the second processing unit discards telegrams using the first addressing technique. In this context, the specified time window may e.g. correspond to the time window in which the first processing unit discards telegrams using the second addressing technique if e.g. only telegrams using the first addressing technique are to be forwarded to the transmitting logic by the first processing unit within the specified time window. The same applies to the predefined time window with respect to the second processing unit.

For example, a process may be cyclically repeated every 1 ms. It is conceivable that the master subscriber sets the time window to 1 ms and divides this up into a first time window of 500 μs and a second time window of a further 500 μs. Here, e.g. telegrams using the first addressing technique may be output by the master subscriber in the first time window, while telegrams using the second addressing technique are output by the master subscriber or another master subscriber in the second time window. As a rule, the first processing unit does not process a telegram using the second addressing technique because the telegrams using the second addressing technique have a data field in the header section of the telegrams that is embodied as a type field (Ethertype) that differs from the type field in the header section of the telegrams using the first addressing technique. The type field in each case comprises a value indicating a used protocol of a next higher layer within user data, wherein a layer and a next higher layer are defined according to the OSI model (OSI: Open Systems Interconnection), i.e. the reference model for transmitting data protocols in a layered architecture. For example, the type field has the value 0x88A4 (in the hexadecimal system) if the telegram using the first addressing technique is embodied as a passing telegram and here in particular as an EtherCAT telegram since this value is associated with the real-time capable EtherCAT data transmission protocol.

However, the proposed network subscriber, automation network and receiving logic are not limited to the mentioned example, since the time window may also be set differently and, as the case may be, without further subdivision. In addition, it is conceivable that the setting of the time window may also be changed by the master subscriber.

In a further embodiment, the receiving logic in the first filter setting is embodied to distinguish the telegrams having the first addressing technique and the telegrams having the second addressing technique on the basis of a switch-over telegram by which the forwarding of telegrams using the first addressing technique received via the receiving port to the first processing unit or of telegrams using the second addressing technique received via the receiving port to the second processing unit is switched over by the receiving logic. In the second filter setting, the first processing unit and the second processing unit are embodied to distinguish the telegrams having the first addressing technique and the telegrams having the second addressing technique on the basis of the switch-over telegram by which the forwarding of telegrams having the first addressing technique to the transmitting logic is switched over by the first processing unit or by which the forwarding of telegrams having the second addressing technique to the transmitting logic is switched over by the second processing unit. In the third filter setting, the transmitting logic is embodied to distinguish the telegrams using the first addressing technique and the telegrams having the second addressing technique on the basis of the switch-over telegram by which the forwarding of the telegrams having the first addressing technique received from the first processing unit to the transmitting port or the telegrams having the second addressing technique received from the second processing unit to the transmitting port is switched over by the transmitting logic.

With the proposed switch-over telegram, the receiving logic and the transmitting logic may be set specifically as telegram switches for selecting the telegrams using the first addressing technique and the telegrams using the second addressing technique. The switch-over telegram is e.g. sent as a telegram using the first addressing technique via the first processing unit from the master subscriber to the transmitting logic, wherein it is indicated to the transmitting logic that the transmitting logic is to switch over the "switch" subsequently to the switch-over telegram to receiving telegrams using the second addressing technique from the second processing unit. The transmitting logic may comprise two input ports, with a first input port connected to the first processing unit and a second input port connected to the second processing unit. In the mentioned example, the telegrams using the second addressing technique as well as the telegrams using the first addressing technique are e.g. discarded prior to sending the switch-over telegram, which are received by the transmitting logic via the second input port of the transmitting logic from the second processing unit. With the switch-over telegram, the telegrams using the first addressing technique from the first processing unit, which reach the transmitting logic on its first input port, and the telegrams using the first addressing technique from the second processing unit, which reach the transmitting logic on its second input port, are then discarded by the transmitting logic. Furthermore, the transmitting logic discards telegrams using the second addressing technique from the first processing unit. Furthermore, the transmitting logic and the receiving logic may be set differently from the above description. The receiving logic, on the other hand, may e.g. comprise only one input port through which the receiving logic may receive the switch-over telegram from the master subscriber.

In addition, the first processing unit and the second processing unit may also be specifically set as telegram switches by the proposed switch-over telegram.

In a further embodiment, the telegrams using the first addressing technique are realized as passing telegrams, for processing by the automation network subscribers, and the telegrams using the second addressing technique are realized as individual telegrams, for processing by the automation network subscribers. The second processing unit of the network subscriber in each case checks on the basis of a target address of the individual telegrams whether an individual telegram is intended for the network subscriber. If the target address of an individual telegram matches a hardware address of the network subscriber in each case, the second processing unit is embodied to process the individual telegram. Otherwise, the second processing unit is embodied to forward the individual telegram to the transmitting logic for output via the transmitting port.

If the telegrams using the first addressing technique are realized as passing telegrams and the telegrams using the second addressing technique as individual telegrams, the delay time of the telegrams remains calculable in an advantageous manner. This is because the individual telegrams must be delayed until the target address of the individual telegrams has been received in each case, so that the second processing unit may evaluate whether the network subscriber is addressed by the telegram or not. This means that individual telegrams may be temporarily stored in the memory unit of the network subscriber until the target address is received, which may be embodied as a MAC address (MAC: Media Access Control) in the same way as the hardware address of the network subscriber, while the passing telegrams are e.g. only delayed by the pass-through delay time. This refers to the time required for a passing telegram to pass through the network subscriber. A passing telegram, in particular in the case of it being embodied as an EtherCAT telegram, does not have to be buffered when the telegram is received, but may be processed instantaneously (on the fly) by the network subscriber from the first processing unit.

The embodiment of the telegrams and the proposed network subscriber allow for combining individual network subscriber addressing with multiple network subscriber addressing in an automation network, wherein multiple network subscriber addressing herein refers to the addressing of multiple network subscribers in the automation network. For example, the master subscriber may address a single network subscriber in order to request diagnostic data of the network subscriber, while at the same time this subscriber may be integrated in the control mode, e.g. to process passing telegrams and then send them to the next subscriber for processing.

In a further embodiment, the passing telegrams are embodied as EtherCAT telegrams and the individual telegrams are embodied as Ethernet telegrams. Thus, the known EtherCAT standard as well as the known Ethernet standard may be used for the structure of the telegrams in an advantageous way. In particular, this prevents compatibility problems with existing systems that use the known standards.

In a further embodiment, the second processing unit is embodied to generate telegrams using the second addressing technique and to forward the telegrams using the second addressing technique to the transmitting logic for output via the transmitting port. The invention is not limited to receiving telegrams using the first addressing technique and telegrams using the second addressing technique, but the network subscriber may also independently generate telegrams using the second addressing technique by the second processing unit and send them via the transmitting port. If the telegrams using the first addressing technique are embodied as passing telegrams and in particular as EtherCAT telegrams, the proposed network subscriber generally does not generate an independent EtherCAT telegram via the first processing unit and send it. This is because the network subscribers in an EtherCAT network are only embodied to put information into the EtherCAT telegrams generated by the master subscriber or to read information from the EtherCAT telegrams generated by the master subscriber. However, if the passing telegrams are not embodied as EtherCAT telegrams, the first processing unit may e.g. also be embodied to generate passing telegrams.

In a further embodiment, when the network subscriber simultaneously receives a telegram using the first addressing technique or a telegram using the second addressing technique via the receiving port, the network subscriber is embodied to buffer the telegram using the first addressing technique received via the receiving port or the telegram using the second addressing technique received via the receiving port. The transmitting logic is embodied to forward the telegram generated by the second processing unit using the second addressing technique for output via the transmitting port. In an alternative embodiment, when the network subscriber simultaneously receives a telegram using the first addressing technique or a telegram using the second addressing technique via the receiving port, the network subscriber is embodied to fragment the telegram using the second addressing technique generated by the second processing unit and to forward the telegram using the first addressing technique received via the receiving port by the transmitting logic for output via the transmitting port or to forward the telegram using the second addressing technique received via the receiving port through the transmitting logic for output via the transmitting port.

If the network subscriber, i.e. the second processing unit, is embodied to generate telegrams having the second addressing technique, it is possible that the network subscriber, during the transmission process of a generated telegram using the second addressing technique via the transmitting port, simultaneously receives a telegram using the first addressing technique or a telegram using the second addressing technique from the master subscriber via the receiving port. It is conceivable that the telegram having the first addressing technique or the telegram having the second addressing technique received via the receiving port is buffered in a further memory unit of the network subscriber, which may e.g. be connected to the transmitting logic. It is also conceivable that the network subscriber comprises a central memory unit that is connected to both the transmitting logic and the receiving logic. In the case of buffering of the received telegram, the transmission process of the telegram generated by the second processing unit may be continued without interruption.

Alternatively, it is also conceivable that a priority value is assigned to the telegrams in the automation network and, e.g. the telegrams received via the receiving port using the first addressing technique or the received telegrams using the second addressing technique are prioritized higher, e.g. by a first priority value, which is higher than a second priority value for the telegrams generated by the second processing unit using the second addressing technique. In the example described with the assigned priority values, the network subscriber may interrupt the transmission process of the generated telegram using the second addressing technique via the transmission port of the network subscriber, i.e. fragment the telegram and buffer it in the further memory unit. The network subscriber may not send the temporarily stored telegram generated by the second processing unit via the transmitting port until e.g. the transmission of the telegram received via the receiving port is completely finished. In connection with the fragmenting of the telegram generated by the second processing unit using the second addressing technique, the possibility of multiple fragmenting is also conceivable, provided that during the transmission process of a fragment via the transmitting port of the network subscriber a higher-priority telegram is again received by the network subscriber via the receiving port using the first or second addressing technique.

In a further embodiment, when the network subscriber simultaneously receives a telegram using the first addressing technique or a telegram using the second addressing technique via the receiving port, the transmitting logic of the network subscriber is embodied to buffer the telegram using the first addressing technique received via the receiving port or the telegram using the second addressing technique received via the receiving port. Furthermore, the transmitting logic is embodied to forward the telegram generated by the second processing unit using the second addressing technique for output via the transmitting port. In an alternative embodiment, when the network subscriber simultaneously receives a telegram using the first addressing technique or a telegram using the second addressing technique via the receiving port, the transmitting logic is embodied to fragment the telegram using the second addressing technique generated by the second processing unit and to forward the telegram using the first addressing technique received via the receiving port for output via the transmitting port or to forward the telegram using the second addressing technique received via the receiving port for output via the transmitting port. In this context, the features mentioned above in connection with the embodiment of the network subscriber may apply equally to the embodiment of the transmitting logic.

The advantageous embodiments and further developments of the invention explained above and/or reproduced in the dependent claims may be used individually or in any combination with one another—except e.g. in cases of clear dependencies or incompatible alternatives.

BRIEF DESCRIPTION OF THE DRAWINGS

The above-described properties, features and advantages of the present invention, as well as the manner in which they are achieved, will become clearer and more clearly understood in connection with the following description of embodiments, which will be explained in more detail in connection with the schematic drawings, in which.

Figure 1:
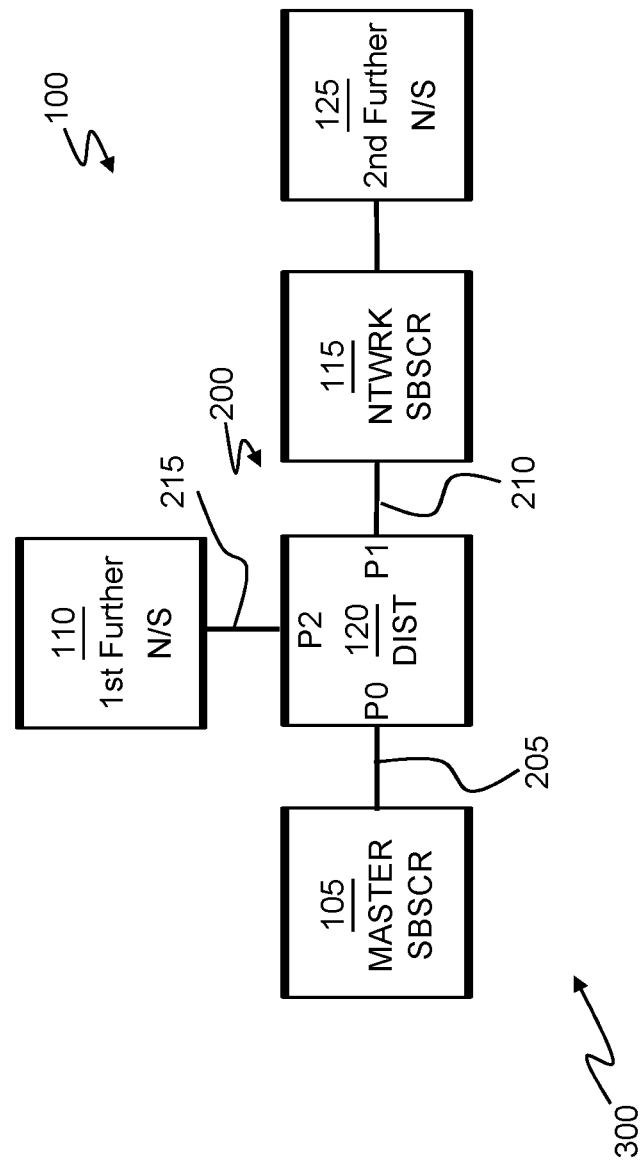
FIG. 1 shows a schematic structure of an automation network comprising network subscribers, which is embodied to execute a method for transmitting data.

It should be noted that the figures are merely schematic in nature and not to scale. In this sense, components and elements shown in the figures may be exaggeratedly large or reduced in size for better understanding. Furthermore, it is pointed out that the reference signs in the figures remain unchanged if the elements and/or components are of the same embodiment.

DETAILED DESCRIPTION

Automation networks are usually realized as field-bus systems, in which the automation network subscribers are networked with one another via the field bus. The automation network subscribers may be embodied as a master subscriber, as a network distributor and as a plurality of network subscribers or slave subscribers. The aforementioned automation network subscribers may be embodied to exchange data with control units. As a rule, the telegram traffic of the automation network subscribers for control operation is implemented by telegrams using a uniform addressing technique, which may be processed by all automation network subscribers in the automation network. Automation networks with automation network subscribers that enable so-called "mixed operation," i.e. network subscribers that are embodied to process both telegrams using a first addressing technique, or a first underlying data transmission protocol, and telegrams using a second addressing technique, or a second underlying data transmission protocol, are not yet known.

The main idea of the proposed network subscriber is that the said network subscriber is able to process telegrams using a first addressing technique, the telegrams here being e.g. embodied as so-called "passing telegrams" and being processed in passing by the network subscriber and the subsequent automation network subscribers, as well as being able to process telegrams using a second addressing technique, the telegrams here being e.g. embodied as so-called "individual telegrams" and being processed in each case by a network subscriber for which an individual telegram is intended. Furthermore, the network subscriber may also be embodied to process further telegrams with further addressing techniques, since it is conceivable that further telegrams with further addressing techniques are output in the automation network.

The structure and functionality of the network subscriber and of the automation network are described below on the basis of FIGS. 1 to 3, with the associated reference numerals from the three figures being used in the description where appropriate and necessary. If in the following reference is made to telegrams using a first addressing technique 500 as well as telegrams using a second addressing technique 510, this always includes individual telegrams using the first addressing technique as well as individual telegrams using the second addressing technique. Conversely, when the terms "a telegram using the first addressing technique" and "a telegram using the second addressing technique" are used in the following, a plurality of telegrams using the first addressing technique and a plurality of telegrams using the second addressing technique are also fully included.

FIG. 1 shows a schematic structure of an automation network 100 with automation network subscribers 300, which is embodied for a method for transmitting data. The automation network 100 comprises automation network subscribers 300, which are interconnected via a data line network 200. At least one automation network subscriber 300 of the automation network 100 is configured as a master subscriber 105. The master subscriber 105 is connected to a first input/output port P0 of a network distributor 120 via a first data line 205. The network distributor 120 may be connected to a first further network subscriber 110 via a third input/output port P2 via a third data line 215. The first further network subscriber 110 may be configured as a slave subscriber.

Via a second input/output port P1 of the network distributor 120 and a second data line 210, the network distributor 120 may be connected to a network subscriber 115 as well as to a second further network subscriber 125. For example, the network subscriber 115 and the second further network subscriber 125 may each be embodied as slave subscribers. The illustrations of the automation network subscribers 300 and the input/output ports of the network distributor 130 have been chosen by way of example and do not limit the scope of protection. Also, the individual automation network subscribers 300 comprise input/output ports for receiving and forwarding telegrams. The network distributor 120 could also have further input/output ports, to which further automation network subscribers 300 may be connected via further data lines. Furthermore, more automation network subscribers 300 may be connected to the depicted data lines than are shown in FIG. 1.

In the automation network 100 shown in FIG. 1, the network subscriber 115 may in particular be embodied to process telegrams using a first addressing technique 500 and telegrams using a second addressing technique 510. In contrast, the other automation network subscribers 300 in FIG. 1 may e.g. only be embodied for processing telegrams using the first addressing technique 500, with the telegrams using the first addressing technique 500 being e.g. embodied as passing telegrams, and being provided for processing by the automation network subscribers 300 in FIG. 1. In this context, the network distributor 120 may also be provided for processing the passing telegrams. In particular, the telegrams using the first addressing technique 500 may be processed as EtherCAT telegrams by the automation network subscribers 300 on the fly. Moreover, the telegrams using the second addressing technique 510 may e.g. be embodied as individual telegrams and be provided for processing by an automation network subscriber 300 for which the individual telegram is intended. In this context, it is conceivable that the individual telegram is realized as an Ethernet telegram and is not processed by the automation network subscribers 300, with the exception of the network subscriber 115, which is additionally addressable via an individual telegram. The processing of a passing telegram hereby refers to the reading out of the output data of the passing telegram addressed to the network subscriber as well as to the insertion of input data into the passing telegram and forwarding to the subsequent automation network subscriber 300. The processing of an individual telegram is described in more detail with reference to FIG. 2.

The first further network subscriber 110 and the second further network subscriber 125 may each have been short-circuited with a switch via a further input/output port to which no subsequent automation network subscriber 300 is connected, so that they each form the last automation network subscriber 300 in the chain. Thereupon, they each return a passing telegram received from the master subscriber 105 to the master subscriber 105 due to the further input/output port being short-circuited with the switch. The outward line as well as the return line comprise the data line network 200 shown in FIG. 1. The master subscriber 105 may be configured to output both the telegrams using the first addressing technique 500 and the telegrams using the second addressing technique 510 to the automation network subscribers 300 in the automation network 100 shown in FIG. 1. Moreover, the master subscriber 105 may also be embodied to output only telegrams using the first addressing technique 500 or only telegrams using the second addressing technique 510 in the automation network 100, and another master subscriber may be embodied to only output telegrams using the second addressing technique 510 or only telegrams using the first addressing technique 500.

An EtherCAT network usually comprises a data line network 200 with data lines, each of which has an outward line for sending telegrams from the master subscriber 105 to the automation network subscribers 300 and a return line for receiving telegrams from the master subscriber 105. An automation network subscriber 300 in an EtherCAT network is embodied to process a passing telegram on the outward line, i.e. to read the output data of the telegram addressed to the automation network subscriber 300 and to put the input data of the network subscriber into the passing telegram. The return of the passing telegrams takes place in the EtherCAT network via the return line, wherein the automation network subscriber 300 does not process the passing telegrams via the return line. In particular, the last automation network subscriber 300 in the chain according to the above description may send the passing telegram received from the master subscriber 105 on the outward line to the master subscriber 105 via the further input/output port short-circuited with the switch with the return line via the return line. Alternatively, however, processing of the passing telegrams by the automation network subscribers 300 on the return line is also conceivable.

The first input/output port P0 of the network distributor 120, via which the network distributor 120 has received a telegram from the master subscriber 105, may be stored by the network distributor 120 in a memory unit or in a routing table of the network distributor 120 in order to use the first input/output port P0 of the network distributor 120 assigned to the master subscriber 105 as the output port when the telegrams are returned from the network distributor 120.

Figure 2:
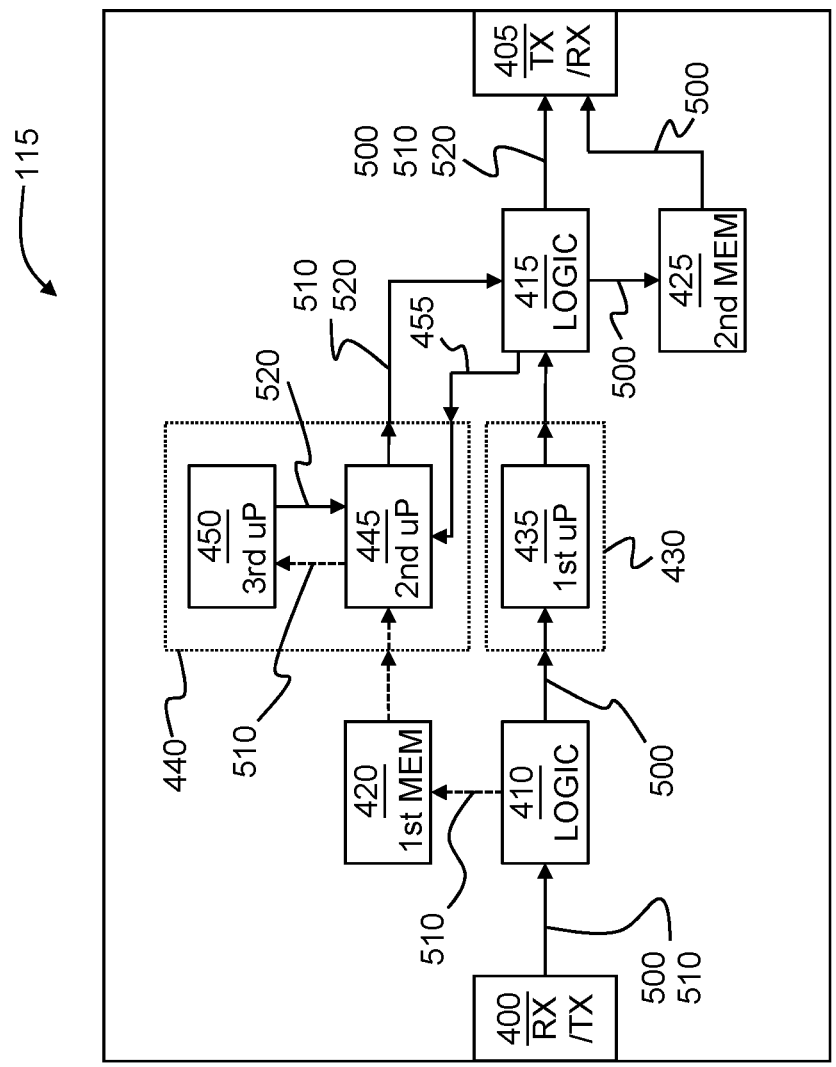
FIG. 2 shows a schematic structure of a network subscriber of FIG. 1, which is embodied to process telegrams using a first and a second addressing technique.

FIG. 2 shows a schematic structure of the network subscriber 115 in the automation network 100 in FIG. 1, which is embodied to process telegrams using the first addressing technique 500 and telegrams using the second addressing technique 510. The automation network 100 shown in FIG. 1 may furthermore have further automation network subscribers 300, which are also embodied to process telegrams using the first addressing technique 500 and telegrams using the second addressing technique 510. In particular, this feature is not limited to the network subscriber 115 in the automation network 100.

The network subscriber 115 comprises at least one receiving port 400 and at least one transmitting port 405, to which further automation network subscribers 300 may be connected via the data line network 200. In FIG. 1, the network subscriber 115 is connected to further automation network subscribers 300 via the second data line 210. The network subscriber 115 is embodied to receive telegrams using the first addressing technique 500 and telegrams using the second addressing technique 510, which are output by the master subscriber 105 via the receiving port 400, and to send them via the transmitting port 405. In this context, the symbols "RX" and "TX" on the receiving port 400 and on the transmitting port 405 respectively stand for receiving and for the receiver (RX: Receive and Receiver, respectively) and for transmitting and the transmitter (TX: Transmit and Transmitter, respectively). The symbols are used to simplify the depiction, in particular to indicate the receipt and transmission of telegrams using the first addressing technique 500 and telegrams using the second addressing technique 510 via the receiving port 400 and via the transmitting port 405 by the network subscriber 115.

The telegrams using the first addressing technique 500 are embodied as passing telegrams and may be processed by all automation network subscribers 300 by a first processing unit 430. As a rule, all automation network subscribers 300 may each be accessed or addressed by passing telegrams. The telegrams using the second addressing technique 510 are embodied as individual telegrams and may be processed by the automation network subscriber 300 in the automation network 100 for which they are intended in each case. In contrast to passing telegrams, in which the automation network subscribers 300 process the telegrams on the fly and are only delayed with a pass-through delay time resulting from a hardware pass-through time, i.e., the pass-through time through the individual network subscriber, an individual telegram requires that the telegrams each be delayed until a target address of the telegram has been received by the automation network subscribers 300. For this purpose, the individual telegrams are buffered in a first memory unit 420 until the network subscriber 115 has received the target address of the individual telegrams in each case.

On the basis of the received target address, which may be embodied as a MAC address (MAC: Media Access Control) in a header section of the individual telegrams, the network subscriber 115 may check whether the telegram is intended for the network subscriber 115. If the target address of an individual telegram matches a hardware address of the network subscriber 115, wherein the hardware address is e.g. also embodied as a MAC address, the network subscriber 115 may process the individual telegram using a second processing unit 440. The individual telegram is then not forwarded to a subsequent automation network subscriber 300. If, on the other hand, the target address of an individual telegram does not match the respective hardware address of the network subscriber 115, the network subscriber 115 forwards the individual telegram to the subsequent automation network subscriber 300 via the transmitting port 405.

If, for example, ten automation network subscribers 300 were networked in a line and configured similarly to the network subscriber 115, and in which an individual telegram is only intended for the tenth automation network subscriber 300 in the chain, the individual telegram would have to be delayed by each of the nine preceding automation network subscribers 300, i.e., buffered, until the nine automation network subscribers 300 have each received the target address of the individual telegram, based on which they could decide whether the individual telegram was destined for them or not. If, on the other hand, a passing telegram is issued from the master subscriber 105 to the ten automation network subscribers 300 via the data line network 200, no additional delay would occur other than the above pass-through delay time resulting from the pass-through time by the individual automation network subscriber 300, because the ten automation network subscribers 300 each process the passing telegram on the fly using the first processing unit 430. The first processing unit 430 and the second processing unit 440 of the network subscriber 115 may be realized in the form of hardware or in the form of software or in the form of both hardware and software.

FIG. 2 shows the situation of receiving (RX) telegrams using the first addressing technique 500 and telegrams using the second addressing technique 510 via the receiving port 400. Alternatively, receiving the telegrams via the transmitting port 405 is conceivable. In addition to the receiving port 400 and transmitting port 405 shown, the network subscriber 115 may comprise further receiving and/or transmitting ports. Telegrams received via the receiving port 400 using the first addressing technique 500 and telegrams received via the receiving port 400 using the second addressing technique 510 arrive at a receiving logic 410, which may be in the form of hardware or software or a combined hardware and software element. The above-mentioned further receive and/or transmitting ports may each comprise a receiving logic 410. The receiving logic 410 may be embodied as a so-called "telegram switch," i.e. it may act as a switch for the telegrams using the first addressing technique 500 and for the telegrams using the second addressing technique 510 and forward said telegrams specifically to the respective processing unit. Thus, the receiving logic 410 may be embodied to forward telegrams using the first addressing technique 500 to the first processing unit 430 for processing, wherein the first processing unit may comprise a first processor chip 435 for processing the telegrams using the first addressing technique 500. In particular, the first processor chip 435 in an automation network 100 configured as an EtherCAT network may be embodied as an EtherCAT slave controller for processing EtherCAT passing telegrams.

After processing the telegrams using the first addressing technique 500 in pass-through through the first processor chip 435, the first processing unit 430 forwards the telegrams using the first addressing technique 500 to a transmitting logic 415. The transmitting logic 415 may be embodied as a "telegram switch" in the same way as the receiving logic 410. This is particularly conceivable if the receiving logic 410 is embodied to duplicate the telegrams using the first addressing technique 500 and the telegrams using the second addressing technique 510, and to forward one telegram each to the first processing unit 430 and the second processing unit 440. In that case, the transmitting logic may preferably act as a telegram switch to perform a selection of the telegrams and to selectively output them via the transmitting port 405.

Furthermore, in the situation shown in FIG. 2, the receiving logic 410 is embodied to buffer telegrams using the second addressing technique 510 in a first memory unit 420 until the target addresses of the telegrams have been received in each case. The first memory unit 420 may be embodied as a so-called "FIFO memory." A FIFO memory (FIFO: First In First Out) is a buffer memory according to a "queuing principle," which is embodied to catch data that cannot be processed immediately. By definition, a FIFO functions in such a way that the first element (First In) that is inserted "at the back" of the queue is later also the first to be retrieved "at the front" (First Out). The telegrams using the second addressing technique 510 are then forwarded to the second processing unit 440, as the second processing unit 440 evaluates the target address of the telegrams using the second addressing technique 510.

In FIG. 2, the second processing unit 440 comprises a second processor chip 445 and a third processor chip 450. The second processor chip 445 is e.g. configured as an Ethernet controller or as a so-called "MAC" and the third processor chip 450 is e.g. configured as a microcontroller (µC) or a microprocessor (µP). In FIG. 2, the second processor chip 445 and the third processor chip 450 form separate components. However, they may also be embodied as a joint component. It is also conceivable that the first processing unit 430 and the second processing unit 440, comprising the first to third processor chips 430, 445, 450 are implemented in a joint component, preferably in an ASIC (ASIC: Application Specific Integrated Circuit), i.e. in an electronic circuit implemented as an integrated circuit. It is also conceivable that the second processor chip 445 of the second processing unit 440 is embodied to process the telegrams using the second addressing technique 510, provided that the second processor chip 445 is extended to include the functionality of processing.

In this context, it is furthermore conceivable that the first processing unit 430, i.e. the first processor chip 435, in particular when configured as an EtherCAT slave controller, may be embodied to enable telegrams using the first addressing technique 500 that are blocked for processing by the automation network subscribers 300, and indicating this via a first value of an EtherCAT protocol type, by the first processor chip 435 overwriting the first value of the EtherCAT protocol type with a second value indicating to the automation network subscribers 300 by default the enabling of the processing of the telegrams using the first addressing technique 500. Conversely, the first processor chip 435 may also be configured to block an unblocked telegram by the first processor chip 435 setting the second value of the EtherCAT protocol type to the first value. It is conceivable that the described functions of unlocking or blocking the telegrams using the first addressing technique 500 is at first deactivated in the first processor chip 435 and may be activated if required, e.g. by the master subscriber 105 in the course of configuring the automation network 100 and the automation network subscribers 300.

The second processor chip 445 of the second processing unit 445 evaluates the target address of the telegrams using the second addressing technique 510 by comparing the target address of the telegrams using the second addressing technique 510 with the hardware address of the second processor chip 445 or with the hardware address of the second processing unit 440 in general. If the target address of the telegrams using the second addressing technique 510 matches the hardware address in each case, the second processor chip 445 forwards the telegrams using the second addressing technique 510 to the third processor chip 450 for processing. On the other hand, if the target address of the telegrams using the second addressing technique 510 does not match the hardware address of the second processor chip 445, the second processor chip 445 forwards the telegrams using the second addressing technique 510 to the transmitting logic 415 for transmission (TX) via the transmitting port 405 to a subsequent automation network subscriber 300. If the receiving logic 410 already acts as a telegram switch, as in the described example, it is not necessary for the transmitting logic 415 to additionally act as a telegram switch for selecting the telegrams.

Moreover, the second processing unit 440 may be configured, that is, the third processor chip 450 of the second processing unit 440 may be configured, to independently generate a telegram using the second addressing technique 520 and to forward this telegram to the second processor chip 445. Provided that the transmitting port 405 is not occupied, i.e. no telegram using the first addressing technique 500 or no telegram using the second addressing technique 510 is currently being output via the transmitting port 405, the second processor chip 445 receives a transmission signal 455 indicating to the second processor chip 445 that it may forward the generated telegram using the second addressing technique 520 to the transmitting logic 415 for output via the transmitting port 405. For example, if, prior to outputting the generated telegram using the second addressing technique 520, the second network subscriber 115 e.g. receives telegrams using the first addressing technique 500 via the receiving port 400, which telegrams are forwarded by the receiving logic 410 to the first processing unit 430 for processing and are forwarded by the first processing unit 430 to the transmitting logic 415, the transmitting logic 415 or the network subscriber 115 may be embodied to buffer the telegrams using the first addressing technique 500 in a second memory unit 425. For example, the transmission process of the generated telegram using the second addressing technique 520 may at first be completed.

Alternatively, the network subscriber 115 may also receive telegrams using the second addressing technique 510 via the receiving port 400 and buffer them in the second memory unit 425 if their respective target addresses do not match the hardware address of the second processor chip 445 or, in general, the hardware address of the second processing unit 440. In the event that a priority value is assigned to the telegrams in each case, that is, a first priority value is assigned in each case to the telegrams using the first addressing technique 500 and to the telegrams using the second addressing technique 510 received via the receiving port 400, and a second priority value is assigned to the generated telegram using the second addressing technique 520 output via the transmitting port 405, wherein the first priority value is embodied to be higher in value than the second priority value, the transmission logic 415 or the network subscriber 115 may also be embodied to interrupt the transmission process of the generated telegram using the second addressing technique 520 and to buffer the part of the telegram not yet transmitted in the second memory unit 425. The transmitting logic 415 or the network subscriber 115 may thus be embodied to fragment the generated telegram using the second addressing technique 520 and to transmit it in fragments, wherein e.g. the telegrams using the first addressing technique 500 received via the receiving port 400 and the telegrams using the second addressing technique 510 may be output with priority via the transmitting port 405 by the transmitting logic 415 for transmission (TX). Alternatively, the transmission (TX) of the telegrams may be performed via the receiving port 400 and the reception (RX) via the transmitting port 405. Therefore, both the receiving port 400 and the transmitting port 405 in FIG. 2 have the symbols identifying the receipt (RX) and the transmission (TX), since the data line network 200 may have bidirectional data lines over which transmission and reception may be performed simultaneously.

For clarity reasons, internal connections of individual components of the second network subscriber 115 are additionally shown in FIG. 2. The following description of the internal connections refer to the first filter setting 600, in which the receiving logic 410 is embodied to select telegrams using the first addressing technique 500 and telegrams using the second addressing technique 510. However, the internal connections of the components of the network subscriber 115 are not limited to this description. The network subscriber 115 comprises a connection of the receiving port 400 to the receiving logic 410. The receiving logic 410 is connected to the first memory unit 420, and the second processing unit 440 may access the first memory unit 420 based on a connection between the first memory unit 420 and the second processing unit 440 to be able to perform the evaluation of the target address of a telegram using the second addressing technique 510. The second processor chip 445 and the third processor chip 450 of the second processing unit 440 have internal connections, too, so that when the target address of the telegram using the second addressing technique 510 matches the hardware address of the second processor chip 445 or, more generally, the hardware address of the second processing unit 440, the second processor chip 445 may transfer the telegram using the second addressing technique 510 to the third processor chip 450 for processing.

Furthermore, the second processing unit 440 comprises a connection to a second input port of the transmitting logic 415 to enable a telegram using the second addressing technique to be forwarded to the transmitting logic 415. The transmitting logic 415 may further be connected to a second memory unit 425 of the second network subscriber 115 to allow the transmitting logic 415 to e.g. buffer a telegram using the first or second addressing technique received simultaneously via the receiving port 400 during the transmission process of a generated telegram using the second addressing technique 520 from the second processing unit 440. Both the second memory unit 425 and the transmitting logic 415 may each have a connection to the transmitting port 405 of the second network subscriber 115.

Furthermore, the receiving logic 410 may comprise a connection to the first processor chip 435 of the first processing unit 430 to forward the telegrams using the first addressing technique 500 to the first processing unit 430 and to the first processor chip 435 for processing. The first processing unit 430 comprising the first processor chip 435 further comprises a connection to a first input port of the transmitting logic 415 to be able to forward a telegram comprising the first addressing technique 500 after processing by the first processing unit 430 and/or the first processor chip 435. The connections of the transmitting logic 415 are the same as explained above for buffering a telegram using the first addressing technique 500 in the second memory unit 425 or directly outputting it via the transmitting port 405 of the second network subscriber 115.

Figure 3:
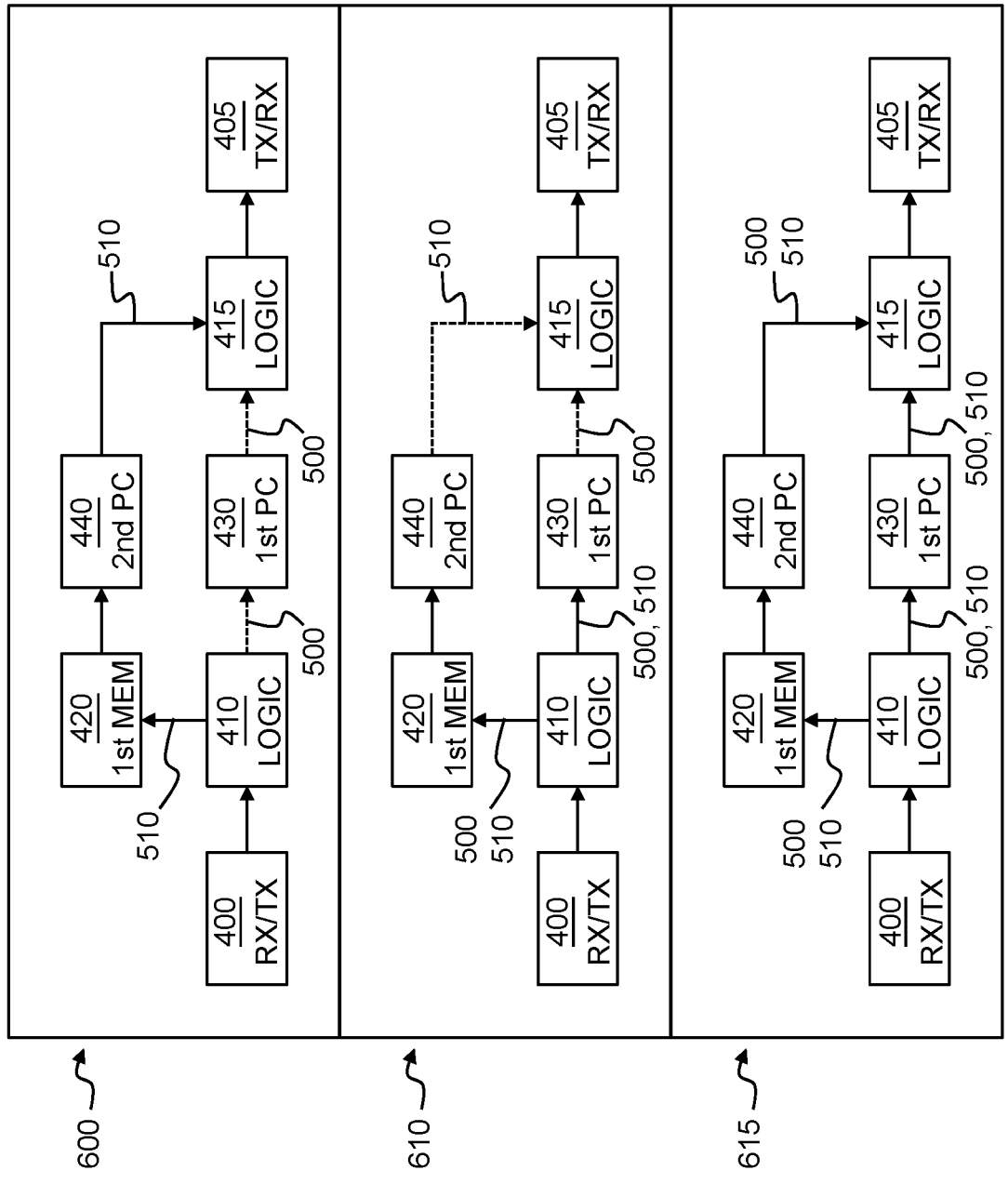
FIG. 3 is a schematic description of a first to third filter setting for filtering the telegrams using the first and second addressing techniques by the network subscriber shown in FIG. 2.

FIG. 3 shows a schematic depiction of a first to third filter setting 600, 610, 615, i.e. how the telegrams using the first addressing technique 500 and the telegrams using the second addressing technique 510 may be selected or filtered, respectively, on the basis of the various components of the network subscriber 115 shown in FIG. 2. For the illustration of the individual filter settings of FIG. 3, in which the settings may e.g. be made in each case by the master subscriber 105 it has been assumed that the second processing unit 440 does not generate a telegram using the second addressing technique 520. Accordingly, no second memory unit 425 is shown in FIG. 3. However, this only serves to simplify the description of the individual filter settings and is not to be interpreted as limiting the filter settings. Nevertheless, the second processing unit 440 may also be embodied with respect to the individual filter settings to generate a telegram using the second addressing technique 520.

The first filter setting 600 refers to the upper half of FIG. 3. In the first filter setting 600, the receiving logic 410 is embodied to specifically select telegrams using the first and second addressing techniques 500, 510 received via the receiving port 400 and to forward them to the corresponding processing unit after the selection. Thereby, the selection of the telegrams using the first and the second addressing technique 500, 510 may be based on an embodiment of the telegrams, in which in each case a header section of the telegrams using the first addressing technique 500 is formed differently from a header section of the telegrams using the second addressing technique 510. It is conceivable here that the preamble of the telegrams is formed differently, since the preamble in an Ethernet data frame according to the IEEE 802.3 standard forms the start section in the header section of a telegram and may thus be the basis for the earliest possible forwarding decision. For example, the bit sequence of the preamble of the telegrams using the first addressing technique in the header section may be formed differently from the bit sequence of the preamble of the telegrams using the second addressing technique in the header section.

In addition to the different embodiment of the preamble, each other data field according to the IEEE 802.3 Ethernet data frame structure for the telegrams using the first and second addressing technique may also be embodied differently from one another, so that a differentiation of the telegrams is possible on the basis of their header sections. In the context, the above explanation is based on the fact that both the telegrams using the first addressing technique 500 and the telegrams using the second addressing technique 510 are each structured according to the known IEEE 802.3 format, or if they comprise a tag, they comply with the IEEE 802.1Q standard. Thus, in the first filter setting 600, the receiving logic 410 may be set by the master subscriber 105 to distinguish a telegram using the first addressing technique 500 or using the second addressing technique 510 received via the receiving port 400 based on its header section.

If the receiving logic 410 recognizes the telegrams using the first addressing technique 500 based on their header sections, the receiving logic 410 specifically forwards them to the first processing unit 430 for processing by the first processor chip 435. The first processing unit 430 respectively forwards the telegrams using the first addressing technique 500 to the transmitting logic 415 after processing by the first processing unit 430, wherein the transmitting logic 415 in the first filter setting 600 is e.g. not embodied as a telegram switch since the selection of the telegrams has already been performed by the receiving logic 410.

If the receiving logic 410 is able to recognize the telegrams using the second addressing technique 510 on the basis of their header sections, the receiving logic 410 forwards the telegrams using the second addressing technique 510 specifically to the first memory unit 420, by which the telegrams using the second addressing technique 510 are buffered until the target addresses of the telegrams using the second addressing technique 510 have been received in each case. The second processing unit 440 checks whether the target addresses of the telegrams using the second addressing technique 510 match the hardware address of the second processing unit 440, and processes the telegrams using the second addressing technique 510 in case of a match. Otherwise, the second processing unit 440 forwards the telegrams using the second addressing technique 510 to the transmitting logic 415, which outputs them to a subsequent automation network subscriber 300 via the transmitting port 405.

As an alternative to the above description regarding the selection of the telegrams using the first addressing technique 500 and the telegrams using the second addressing technique 510 by the receiving logic 410, the receiving logic 410 may distinguish the telegrams using the first addressing technique 500 and the telegrams using the second addressing technique 510 received via the receiving port 400 based on a switch-over telegram. The switch-over telegram may be used to switch the forwarding of telegrams using the first addressing technique received subsequently to the switch-over telegram via the receiving port 400 from the master subscriber 105 to the first processing unit 430 or received telegrams using the second addressing technique 510 to the second processing unit 440 by the receiving logic 410. Thus, master subscriber 105 sends the switch-over telegram to the network subscriber 115 to e.g. indicate to the receiving logic 410 when the telegrams with first addressing technique 500 have been previously selected for forwarding to the first processing unit 430, that the telegrams with second addressing technique 510 will be sent to the network subscriber 115 after the switch-over telegram from the master subscriber 105. The receiving logic 410 may be set at the same time as the switch-over telegram such that the receiving logic 410 forwards telegrams using the second addressing technique 510 received after the switch-over telegram to the second processing unit 440.

In another alternative to the above description, the receiving logic 410 may be configured to distinguish between telegrams using the first addressing technique 500 and telegrams using the second addressing technique 510 based on a predefined time window. In the time window determined by the master subscriber 105, telegrams using the first addressing technique 500 and telegrams using the second addressing technique 510 may respectively be received by the receiving logic 410 via the receiving port 400. For example, the predefined time window may be embodied as a cyclically repeating time window by the master subscriber 105. For example, a process may be repeated cyclically every 1 ms. Conceivably, the master subscriber 105 may set the time window to 1 ms and divide it up into a first time window of 500 μs and a second time window of another 500 μs. Here, in the first time window, e.g. telegrams using the first addressing technique 500 may be output by the master subscriber 105, which the receiving logic 410 e.g. forwards to the first processing unit 430 based on the configuration of the master subscriber 105 related to the predefined time window. In the second time window, telegrams using the second addressing technique 510 may be output by the master subscriber 105 or another master subscriber, and the receiving logic 410 may forward these telegrams specifically to the second processing unit 440 for address matching and possible processing based on the setting.

In the second filter setting 610 in the center of FIG. 3, the receiving logic 410 is embodied to duplicate telegrams using the first addressing technique 500 and the second addressing technique 510 received via the receiving port 400 of the second network subscriber 115 and to forward one telegram each to the first processing unit 430 and to the second processing unit 440. For example, in the second filter setting 610, the receiving logic 410 may be embodied to duplicate only the telegrams using the first addressing technique 500 and the telegrams using the second addressing technique 510, and not to act as a telegram switch to select the telegrams. For example, this functionality may be disabled in the second filter setting 610. The first processing unit 430 is embodied to discard telegrams using the second addressing technique 510, and the second processing unit 440 is configured to discard telegrams using the first addressing technique 500. That is, the first and second processing units 430, 440 are embodied as telegram switches for selecting telegrams in the second filter setting 610. Here, the first processing unit 430 selects telegrams using the first addressing technique 500 for processing by the first processor chip 435 and discards telegrams using the second addressing technique 510. The second processing unit 440 selects telegrams using the second addressing technique 510 for processing, provided that the target address of the telegrams using the second addressing technique 510 matches the hardware address of the second processing unit 440, respectively.

Furthermore, the transmitting logic 415 is embodied to forward telegrams received from the first processing unit 430 and/or from the second processing unit 440, respectively, to the transmitting port 405 of the second network subscriber 115, provided that in each case the target address of the telegrams using the second addressing technique 510 does not match the hardware address of the second processing unit 440, since the second processing unit 440 otherwise processes the telegrams using the second addressing technique 510 and does not forward them to the transmitting logic 415. In the second filter setting 610, the transmitting logic 415 is e.g. not embodied analogously to the receiving logic 410, for example, because the transmitting logic 415 embodied to duplicate the telegrams using the first addressing technique 500 and the telegrams using the second addressing technique 510, for example. In principle, however, the receiving logic 410 and the transmitting logic 415 may comprise the same functionalities. The telegrams using the first addressing technique 500 and the telegrams using the second addressing technique 510 are then forwarded to one or to a plurality of subsequent automation network subscribers 300 via the transmitting port 405 of the network subscriber 115.

The selection of the telegrams using the first addressing technique 500 and of the telegrams using the second addressing technique 510 by the first processing unit 430 and the second processing unit 440 may respectively be based on the different types of embodiment of the header sections of the telegrams, in which the header section of the telegrams using the first addressing technique 500 is embodied differently from the header section of the telegrams using the second addressing technique 510, respectively. For example, the preamble of the telegrams may be embodied differently and may form the basis for selecting the telegrams, as explained above in connection with the first filter setting 600. The above features apply analogously to the second filter setting 610. In this context, it is conceivable that the first processing unit 430 and the second processing unit 440 are each configured to forward a control signal to the transmitting logic 415 so that the transmitting logic 415 forwards the telegram using the first addressing technique 500 received from the respective processing unit or the received telegram using the second addressing technique 510 to the transmitting port 405.

For example, the first processing unit 430 may respectively be set to not process the telegrams using the second addressing technique 510 based on a data field embodied as a type field (Ethertype) that the telegrams each have in the header section and that differs from the type field in the header section of the telegrams using the first addressing technique 500. Each type field includes a value indicating a used protocol of a next higher layer within the user data, wherein a layer and a next higher layer are defined according to the open systems interconnection (OSI) model, that is, the reference model for transmitting data protocols in a layered architecture. For example, the type field has the value 0x88A4 (in the hexadecimal system) if the telegram using the first addressing technique 500 is embodied as a passing telegram and herein in particular as an EtherCAT telegram, since this value is linked with the real-time capable EtherCAT data transmission protocol. The telegrams using the second addressing technique 510 do not have this value in the type field, therefore the first processing unit 430 may e.g. distinguish the telegrams for processing in each case based on the type field. For example, in this context, it may be set that the first processing unit 430 discards telegrams using the second addressing technique 510 and the type field different from the telegrams using the first addressing technique 500, instead of forwarding them according to an alternative setting of the first processing unit 430.

Furthermore, it is conceivable that in the second filter setting 610, the selection of the telegrams using the first addressing technique 500 and the telegrams using the second addressing technique 510 by the first processing unit 430 and by the second processing unit 440 is based in each case on the predefined time window described above in which telegrams using the first addressing technique 500 and telegrams using the second addressing technique 510, respectively, are received by the receiving logic 410 via the receiving port 400. The above features may also apply to the second filter setting 610. In addition, the selection of the telegrams using the first addressing technique 500 and the telegrams using the second addressing technique 510 may be based on the above-mentioned switch-over telegram, which is used to switch over the forwarding of telegrams using the first addressing technique 500 to the transmitting logic 415 by the first processing unit 430, or which is used to switch over the forwarding of telegrams using the second addressing technique 510 to the transmitting logic 415 by the second processing unit 440. Again, the above features may apply equally to the second filter setting 610.

In the third filter setting 615 in FIG. 3, the receiving logic 410 is configured analogously to the second filter setting 610 to duplicate the telegrams using the first addressing technique 500 and the telegrams using the second addressing technique 510 received via the receiving port 400 of the network subscriber 115. The receiving logic 410 forwards one telegram to each of the first processing unit 430 and the second processing unit 440. The transmitting logic 415 is configured to forward only telegrams using the first addressing technique 500 from the first processing unit 430 and only telegrams using the second addressing technique 510 from the second processing unit 440 to the transmitting port 405. Thus, the transmitting logic 415 may respectively receive telegrams using the first addressing technique 500 and telegrams using the second addressing technique 510 via the first input port of the transmitting logic 415 and respectively receive telegrams using the first addressing technique 500 and telegrams using the second addressing technique 510 via the second input port of the transmitting logic 415. In this case, both telegrams may be received by the transmitting logic 415 via the two input ports, wherein a telegram from the first processing unit 430 arrives at the first input port of the transmitting logic 415 delayed only by the pass-through delay time, while a telegram from the second processing unit 440 arrives at the second input port of the transmitting logic 415 delayed at least until the target address is fully received. As a rule, the delay by the second processing unit 440 is greater, i.e., longer in time than the pass-through delay time through the first processing unit 430. In the third filter embodiment 610, the transmitting logic 415 is embodied as a telegram switch.

According to the setting of the transmitting logic 415, the transmitting logic 415 may forward telegrams using the first addressing technique 500 received by the transmitting logic 415 from the first processing unit 430 via the first input port of the transmitting logic 415 to the transmitting port 405 of the network subscriber 115. Also, according to its setting by the master subscriber 105, the transmitting logic 415 may forward the telegrams using the second addressing technique 510 received by the transmitting logic 415 from the second processing unit 440 when the target addresses do not match the hardware address of the second processing unit 440 to the transmitting port 405 via the second input port of the transmitting logic 415.

The setting of the transmitting logic 415 for selecting the forwarding of the telegrams using the first addressing technique 500 and the telegrams using the second addressing technique 510 via the output port of the transmission logic 415 to the transmission port 405 of the network subscriber 115 may in this case be carried out on the basis of the predefined time window described above, in which e.g. only telegrams using the first addressing technique 500 or telegrams using the second addressing technique 510 are sent by the master subscriber 105 in each case. Also, as was described above, the predefined time window may e.g. be divided up into two time periods that repeat cyclically. Furthermore, the selection of the telegrams using the first addressing technique 500 and the second addressing technique 510 by the transmitting logic 415 may be based on the switch-over telegrams as explained above in connection with the first filter setting 600. Moreover, the transmitting logic 415 may distinguish the telegrams using the first addressing technique 500 and the telegrams using the second addressing technique 510 based on the different embodiment of their header sections. At this point, reference is made to the above description with respect to the individual variants. In connection with the selection of the telegrams using the first addressing technique 500 and the telegrams using the second addressing technique 510 on the basis of the different embodiments of the header sections, it is also conceivable that the receiving logic 410, in addition to the property of duplicating the telegrams, is also able to recognize the telegrams using the first addressing technique 500 and the telegrams using the second addressing technique 510 themselves on the basis of their different header sections, and forwards a control signal to the transmitting logic 415. The control signal may be used to indicate to the transmitting logic 415 the respective input port of the transmitting logic 415 via which the transmitting logic 415 is to forward a telegram using the first addressing technique 500 or a telegram using the second addressing technique 510 to the transmitting port.

For the second and third filter settings 610, 615, when two telegrams using the second addressing technique 510 are received, in addition to the aforementioned selection options, a setting is conceivable which permits forwarding of a telegram using the second addressing technique 510 from the first processing unit 430, which the transmitting logic 415 has received via the first input port, to the transmitting port 405, provided that the first processing unit 430 is in the second filter setting 610 set to forward the telegrams using the second addressing technique 510 and not to discard it. The first processing unit 430 may forward the telegram using the second addressing technique 510 to the first input port of the transmitting logic 415 delayed only by the pass-through delay time, which may be earlier than the transmitting logic 415 is able to receive the telegram using the second addressing technique 510 from the second processing unit 440 via the second input port. In this way, the delay time in the automation network 100 may be reduced, as well. However, this requires that the target address of the telegrams using the second addressing technique 510 does not match the hardware address of the second processing unit 440.

For the first filter setting 600, arrows with solid lines and arrows with dashed lines have been used in FIG. 3 to indicate that only telegrams using the second addressing technique 510 are respectively forwarded to the first memory unit 420 and the second processing unit 440 via the receiving logic 410, and to the sending logic 415 in case of a mismatch of the target addresses with the hardware address of the second processing unit 440. Also, the receiving logic 410 forwards only telegrams using the first addressing technique 500 to the sending logic 415 via the first processing unit 430. However, the arrow with a solid line between the transmitting logic 415 and the transmitting port 405 of the second network subscriber 115 does not restrict the forwarding of telegrams by the transmitting logic 415 to telegrams using the second addressing technique 510, but serves solely to indicate the forwarding of a telegram using the first addressing technique 500 or a telegram using the second addressing technique 510.

In the second filter setting 610, the arrow with the dashed line between the first processing unit 430 and the transmitting logic 415 serves to illustrate a possible forwarding of telegrams using the first addressing technique 500, since these are selected by the first processing unit 430, while the telegrams using the second addressing technique 510 are e.g. discarded by the first processing unit 430. Similarly, the arrow with the dashed line between the second processing unit 440 and the transmission logic 415 is to be interpreted with respect to the selection of the forwarding of telegrams using the second addressing technique 510 by the second processing unit 440 when the target addresses do not match the hardware address of the second processing unit 440.

Since the selection of the telegrams using the first addressing technique 500 and the telegrams using the second addressing technique 510 in the third filter setting 615 is carried out by the transmitting logic 415, uniformly formed arrows have been used for the depiction in FIG. 3, since depending on the type of telegrams duplicated by the receiving logic 410, either telegrams using the first addressing technique 500 or telegrams using the second addressing technique 510 pass through the two branches from the receiving logic 410 to the transmitting logic 415. However, the depictions of the first to third filter settings 600, 610, 615 are not limited to the exemplary arrows selected.

The proposed network subscriber 115 may also be used in other bus systems and automation networks, respectively, and may comprise further receiving ports and transmitting ports. The further receiving ports and transmitting ports may comprise the above components for selecting the telegrams using the first addressing technique 500 and the telegrams using the second addressing technique 510 and select the telegrams according to the first to third filter settings 600, 610, 615 and according to the above procedures. In the event that the network subscriber 115 comprises further receiving and transmitting ports, and further receiving logics in the first filter setting 600 are embodied to select the telegrams using the first addressing technique 500 and the telegrams using the second addressing technique 510, it is necessary for the master subscriber 105 to make a setting of the further receiving logics to forward telegrams using the first addressing technique 500 along the path intended for the telegrams. For the telegrams using the second addressing technique 510, the further receiving logics of the further receiving and transmitting ports may forward the telegrams on the respective path based on the target address. For this, a separate setting by the master subscriber 105 may be omitted.

The invention has been described in detail with preferred embodiment examples. Instead of the described examples of embodiment, further examples of embodiment are conceivable, which may comprise further variations or combinations of described features. For this reason, the invention is not limited by the disclosed examples, since other variations may be derived therefrom by those skilled in the art without departing from the protective scope of the invention.

TABLE 1

List of Reference Numerals

| | |
|---|---|
| P0 | first input/output port |
| P1 | second input/output port |
| P2 | third input/output port |
| RX | receipt |
| TX | transmission |
| 100 | automation network |
| 105 | master subscriber |
| 300 | automation network subscriber |
| 110 | first further network subscriber |
| 115 | network subscriber |
| 125 | second further network subscriber |
| 120 | network distributor |
| 200 | data line network |
| 205 | first data line |
| 210 | second data line |
| 215 | third data line |
| 400 | receiving port |
| 405 | transmitting port |
| 410 | receiving logic |
| 415 | transmitting logic |

TABLE 1-continued

List of Reference Numerals

| | |
|---|---|
| 420 | first memory unit |
| 425 | second memory unit |
| 430 | first processing unit |
| 435 | first processor chip |
| 440 | second processing unit |
| 445 | second processor chip |
| 450 | third processor chip |
| 455 | transmission signal |
| 500 | telegrams using the first addressing technique |
| 510 | telegrams using the second addressing technique |
| 520 | generated telegram using the second addressing technique |
| 600 | first filter setting |
| 610 | second filter setting |
| 615 | third filter setting |

The invention claimed is:

1. A network subscriber for an automation network, which comprises at least one receiving port and at least one transmitting port to which further automation network subscribers may be connected via a data line network, wherein the network subscriber is configured to receive telegrams using a first addressing technique and telegrams using a second addressing technique via the receiving port and to send them via the transmitting port, wherein the network subscriber comprises a first processing unit for processing the telegrams using the first addressing technique and a second processing unit for processing the telegrams using the second addressing technique, and wherein the network subscriber comprises a receiving logic connected to the receiving port and to the first processing unit and to the second processing unit, and a transmitting logic connected to the transmitting port and to the first processing unit and to the second processing unit;

wherein the telegrams using the first addressing technique are realized as passing telegrams for processing by the automation network subscribers, and the telegrams using the second addressing technique are realized as individual telegrams for processing by the automation network subscribers, wherein the second processing unit of the network subscriber is configured to check in each case on the basis of a target address of the individual telegrams whether an individual telegram is intended for the network subscriber, wherein, if the target address of an individual telegram respectively matches a hardware address of the network subscriber, the second processing unit is configured to process the individual telegram, and wherein the second processing unit is otherwise configured to forward the individual telegram to the transmitting logic for output via the transmitting port;

wherein in a first filter setting, the receiving logic is configured to forward telegrams using the first addressing technique received via the receiving port to the first processing unit and to forward telegrams using the second addressing technique received via the receiving port to the second processing unit and the transmitting logic is configured to forward telegrams received from the first processing unit and from the second processing unit, respectively, to the transmitting port, or wherein in a second filter setting, the receiving logic is configured to duplicate telegrams using the first addressing technique received via the receiving port or telegrams using the second addressing technique received via the receiving port and to respectively forward one telegram to the first processing unit and to the second processing unit and wherein the first processing unit is configured to discard telegrams using the second addressing technique and the second processing unit is configured to discard telegrams using the first addressing technique, and wherein the transmitting logic is configured to forward telegrams received from the first processing unit and from the second processing unit, respectively, to the transmitting port, or wherein in a third filter setting, the receiving logic is configured to duplicate telegrams using the first addressing technique received via the receiving port and telegrams using the second addressing technique received via the receiving port and to respectively forward a telegram to the first processing unit and to the second processing unit, and wherein the transmitting logic is configured to forward only telegrams using the first addressing technique from the first processing unit to the transmitting port and to discard telegrams using the first addressing technique from the second processing unit and to forward only telegrams using the second addressing technique from the second processing unit to the transmitting port and to discard telegrams using the second addressing technique from the first processing unit.

2. The network subscriber according to claim 1, wherein in the first filter setting, the receiving logic is configured to distinguish the telegrams using the first addressing technique and the telegrams using the second addressing technique on the basis of an embodiment of the telegrams in which a header section of the telegrams using the first addressing technique is configured differently from a header section of the telegrams using the second addressing technique, respectively, or wherein in the second filter setting, the first processing unit and the second processing unit are configured to distinguish the telegrams using the first addressing technique and the telegrams using the second addressing technique on the basis of the embodiment of the telegrams in which the header section of the telegrams using the first addressing technique is respectively configured differently from the header section of the telegrams using the second addressing technique, or wherein in the third filter setting, the transmitting logic is configured to distinguish the telegrams using the first addressing technique and the telegrams using the second addressing technique on the basis of the embodiment of the telegrams, in which the header section of the telegrams using the first addressing technique is respectively configured differently from the header section of the telegrams using the second addressing technique.

3. The network subscriber according to claim 1, wherein in the first filter setting, the receiving logic is configured to distinguish the telegrams using the first addressing technique and the telegrams using the second addressing technique on the basis of a fixed time window in which telegrams using the first addressing technique and telegrams using the second addressing technique are respectively received by the receiving logic via the receiving port, or wherein in the second filter setting, the first processing unit and the second processing unit are configured to distinguish the telegrams using the first addressing technique and the telegrams using the second addressing technique on the basis of the predefined time window in which telegrams using the first addressing technique and telegrams using the second addressing technique are respectively received from the receiving logic via the receiving port, or wherein in the third filter setting, the transmitting logic is configured to distinguish the telegrams using the first addressing technique and the telegrams using the second addressing technique on the basis of the predefined time window in which telegrams using the first addressing technique and telegrams using the second addressing technique are respectively received by the receiving logic via the receiving port.

4. The network subscriber according to claim 1, wherein in the first filter setting, the receiving logic is configured to distinguish the telegrams using the first addressing technique and the telegrams using the second addressing technique on the basis of a switch-over telegram, by which the forwarding of telegrams using the first addressing technique received via the receiving port to the first processing unit or of telegrams using the second addressing technique received via the receiving port to the second processing unit is switched over by the receiving logic, or wherein in the second filter setting, the first processing unit and the second processing unit are configured to distinguish the telegrams using the first addressing technique and the telegrams using the second addressing technique on the basis of the switch-over telegram, by which the forwarding of telegrams using the first addressing technique to the transmitting logic is switched over by the first processing unit or by which the forwarding of telegrams using the second addressing technique to the transmitting logic is switched over by the second processing unit, or wherein in the third filter setting, the transmitting logic is configured to distinguish the telegrams using the first addressing technique and the telegrams using the second addressing technique on the basis of the switch-over telegram, by which the forwarding of the telegrams using the first addressing technique received from the first processing unit to the transmitting port or of the telegrams using the second addressing technique received from the second processing unit to the transmitting port is switched over by the transmitting logic.

5. The network subscriber according to claim 1, wherein the passing telegrams are configured as EtherCAT telegrams and the individual telegrams are configured as Ethernet telegrams.

6. The network subscriber according to claim 1, wherein the second processing unit is further configured to generate telegrams using the second addressing technique and to forward the telegrams using the second addressing technique to the transmitting logic for output via the transmitting port.

7. The network subscriber according to claim 6, wherein the network subscriber is configured, if the network subscriber simultaneously receives a telegram using the first addressing technique or a telegram using the second addressing technique via the receiving port, to buffer the telegram using the first addressing technique received via the receiving port or the telegram using the second addressing technique received via the receiving port, and the transmitting logic is configured to forward the telegram using the second addressing technique generated by the second processing unit for output via the transmitting port, or wherein the network subscriber is configured, if the network subscriber simultaneously receives a telegram using the first addressing technique or a telegram using the second addressing technique via the receiving port, to fragment the telegram using the second addressing technique generated by the second processing unit and to forward the telegram using the first addressing technique received via the receiving port by the transmitting logic for output via the transmitting port or to forward the telegram using the second addressing technique received via the receiving port by the transmitting logic for output via the transmitting port.

8. The network subscriber according to claim 7, wherein the transmitting logic of the network subscriber is configured, if the network subscriber simultaneously receives a telegram using the first addressing technique or a telegram using the second addressing technique via the receiving port, to buffer the telegram using the first addressing technique received via the receiving port or the telegram using the second addressing technique received via the receiving port, and to forward the telegram using the second addressing technique generated by the second processing unit for output via the transmitting port, or wherein the transmitting logic of the network subscriber is configured, if the network subscriber simultaneously receives a telegram using the first addressing technique or a telegram using the second addressing technique via the receiving port, to fragment the telegram generated by the second processing unit using the second addressing technique and to forward the telegram using the first addressing technique received via the receiving port for output via the transmitting port or forwarding the telegram using the second addressing technique received via the receiving port for output via the transmitting port.

9. An automation network, wherein the automation network comprises automation network subscribers, wherein at least one automation network subscriber is configured as a master subscriber that outputs telegrams using a first addressing technique and telegrams using a second addressing technique to the automation network subscribers via a data line network, wherein at least one automation network subscriber is configured as a network subscriber, wherein the network subscriber comprises at least one receiving port and at least one transmitting port to which further automation network subscribers may be connected via a data line network, wherein the network subscriber is configured to receive telegrams using a first addressing technique and telegrams using a second addressing technique via the receiving port and to send them via the transmitting port, wherein the network subscriber comprises a first processing unit for processing the telegrams using the first addressing technique and a second processing unit for processing the telegrams using the second addressing technique, and wherein the network subscriber comprises a receiving logic connected to the receiving port and to the first processing unit and to the second processing unit, and a transmitting logic connected to the transmitting port and to the first processing unit and to the second processing unit;

wherein the telegrams using the first addressing technique are realized as passing telegrams for processing by the automation network subscribers, and the telegrams using the second addressing technique are realized as individual telegrams for processing by the automation network subscribers, wherein the second processing unit of the network subscriber is configured to check in each case on the basis of a target address of the individual telegrams whether an individual telegram is intended for the network subscriber, wherein, if the target address of an individual telegram respectively matches a hardware address of the network subscriber, the second processing unit is configured to process the individual telegram, and wherein the second processing unit is otherwise configured to forward the individual telegram to the transmitting logic for output via the transmitting port;

wherein in a first filter setting, the receiving logic is configured to forward telegrams using the first addressing technique received via the receiving port to the first processing unit and to forward telegrams using the second addressing technique received via the receiving port to the second processing unit and the transmitting logic is configured to forward telegrams received from the first processing unit and from the second processing unit, respectively, to the transmitting port, or wherein in a second filter setting, the receiving logic is configured to duplicate telegrams using the first addressing technique received via the receiving port or telegrams using the second addressing technique received via the receiving port and to respectively forward one telegram to the first processing unit and to the second processing unit and wherein the first processing unit is configured to discard telegrams using the second addressing technique and the second processing unit is configured to discard telegrams using the first addressing technique, and wherein the transmitting logic is configured to forward telegrams received from the first processing unit and from the second processing unit, respectively, to the transmitting port, or wherein in a third filter setting, the receiving logic is configured to duplicate telegrams using the first addressing technique received via the receiving port and telegrams using the second addressing technique received via the receiving port and to respectively forward a telegram to the first processing unit and to the second processing unit, and wherein the transmitting logic is configured to forward only telegrams using the first addressing technique from the first processing unit to the transmitting port and to discard telegrams using the first addressing technique from the second processing unit and to forward only telegrams using the second addressing technique from the second processing unit to the transmitting port and to discard telegrams using the second addressing technique from the first processing unit.

10. A hardware receiving logic component for a network subscriber, wherein telegrams using a first addressing technique are realized as passing telegrams for processing by the network subscriber, and telegrams using a second addressing technique are realized as individual telegrams for processing by the network subscriber, and wherein a second processing unit of the network subscriber is configured to check in each case on the basis of a target address of the individual telegrams whether an individual telegram is intended for the network subscriber;

wherein the receiving logic component is configured in a first filter setting to forward telegrams having a first addressing technique to a first processing unit of the network subscriber and the telegrams having the second addressing technique to the second processing unit of the network subscriber, and wherein a transmitting logic of the network subscriber is configured to forward the telegrams to a transmitting port; or wherein the receiving logic component is configured in a second filter setting, to duplicate the telegrams and forward one telegram to each of the first and second processing units of the network subscriber, wherein the first processing unit is configured to discard telegrams using the second addressing technique, wherein the second processing unit is configured to discard telegrams using the first addressing technique, and wherein the transmitting logic is configured to forward the telegrams to the transmitting port; or wherein in a third filter setting the receiving logic component is configured to duplicate received telegrams and to respectively forward a telegram to the first and second processing units, and wherein the transmitting logic is configured to forward only telegrams using the first addressing technique from the first processing unit and only telegrams using the second addressing technique from the second processing unit to the transmitting port.

11. The hardware receiving logic component according to claim 10, wherein the receiving logic component is connected to the receiving port of the network subscriber and to the first processing unit and to the second processing unit of the network subscriber.

12. The hardware receiving logic component according to claim 10, wherein in the first filter setting, the receiving logic component is configured to distinguish the telegrams using the first addressing technique and the telegrams using the second addressing technique on the basis of an embodiment of the telegrams in which a header section of the telegrams using the first addressing technique is configured differently from a header section of the telegrams using the second addressing technique, respectively, or wherein in the second filter setting, the first processing unit and the second processing unit are configured to distinguish the telegrams using the first addressing technique and the telegrams using the second addressing technique on the basis of the embodiment of the telegrams in which the header section of the telegrams using the first addressing technique is respectively configured differently from the header section of the telegrams using the second addressing technique, or wherein in the third filter setting, the transmitting logic is configured to distinguish the telegrams using the first addressing technique and the telegrams using the second addressing technique on the basis of the embodiment of the telegrams, in which the header section of the telegrams using the first addressing technique is respectively configured differently from the header section of the telegrams using the second addressing technique.

13. The hardware receiving logic component according to claim 10, wherein in the first filter setting, the receiving logic component is configured to distinguish the telegrams using the first addressing technique and the telegrams using the second addressing technique on the basis of a fixed time window in which telegrams using the first addressing technique and telegrams using the second addressing technique are respectively received by the receiving logic component via the receiving port, or wherein in the second filter setting, the first processing unit and the second processing unit are configured to distinguish the telegrams using the first addressing technique and the telegrams using the second addressing technique on the basis of the predefined time window in which telegrams using the first addressing technique and telegrams using the second addressing technique are respectively received from the receiving logic component via the receiving port, or wherein in the third filter setting, the transmitting logic is configured to distinguish the telegrams using the first addressing technique and the telegrams using the second addressing technique on the basis of the predefined time window in which telegrams using the first addressing technique and telegrams using the second addressing technique are respectively received by the receiving logic component via the receiving port.

14. The hardware receiving logic component according to claim 10, wherein in the first filter setting, the receiving logic component is configured to distinguish the telegrams using the first addressing technique and the telegrams using the second addressing technique on the basis of a switch-over telegram, by which the forwarding of telegrams using the first addressing technique received via the receiving port to the first processing unit or of telegrams using the second addressing technique received via the receiving port to the second processing unit is switched over by the receiving logic component, or wherein in the second filter setting, the first processing unit and the second processing unit are configured to distinguish the telegrams using the first addressing technique and the telegrams using the second addressing technique on the basis of the switch-over telegram, by which the forwarding of telegrams using the first addressing technique to the transmitting logic is switched over by the first processing unit or by which the forwarding of telegrams using the second addressing technique to the transmitting logic is switched over by the second processing unit, or wherein in the third filter setting, the transmitting logic is configured to distinguish the telegrams using the first addressing technique and the telegrams using the second addressing technique on the basis of the switch-over telegram, by which the forwarding of the telegrams using the first addressing technique received from the first processing unit to the transmitting port or of the telegrams using the second addressing technique received from the second processing unit to the transmitting port is switched over by the transmitting logic.

15. The hardware receiving logic component according to claim 10, wherein the passing telegrams are configured as EtherCAT telegrams and the individual telegrams are configured as Ethernet telegrams.

* * * * *